United States Patent [19]

Morris et al.

[11] Patent Number: 4,551,309
[45] Date of Patent: Nov. 5, 1985

[54] APPARATUS FOR PRODUCING STYRENIC/ALKENYLNITRILE COPOLYMERS

[75] Inventors: Jeffrey D. Morris; Robert A. Fuller, both of Big Spring, Tex.

[73] Assignee: Cosden Technology, Inc., Dallas, Tex.

[21] Appl. No.: 538,235

[22] Filed: Oct. 3, 1983

Related U.S. Application Data

[62] Division of Ser. No. 422,767, Sep. 24, 1982, abandoned.

[51] Int. Cl.$^4$ .................. C08G 18/32; C08G 18/60
[52] U.S. Cl. ........................... 422/135; 422/109; 422/110; 422/132; 422/134; 422/138; 422/207; 422/234; 526/68; 526/342
[58] Field of Search ............... 422/109, 110, 132, 134, 422/135, 138, 234, 240, 207; 165/95, 96 HV, 112, 113; 526/68, 342

[56] References Cited

U.S. PATENT DOCUMENTS

| | | | |
|---|---|---|---|
| 1,134,518 | 4/1915 | Day | 165/113 |
| 1,786,163 | 12/1930 | Kothny | 165/112 |
| 2,634,164 | 4/1953 | Drake | 165/95 X |
| 2,769,804 | 11/1956 | Hanson | 526/68 X |
| 2,924,591 | 2/1960 | Roelen | 422/135 X |
| 2,941,985 | 6/1960 | Amos et al. | 526/342 X |
| 3,258,060 | 6/1966 | Chirico | 165/95 X |
| 3,794,471 | 2/1974 | Latinen | 422/138 X |
| 3,813,369 | 5/1974 | Latinen | 526/342 X |
| 3,859,268 | 1/1975 | Novack et al. | 526/68 X |
| 3,927,983 | 12/1975 | Gordon et al. | 422/134 X |
| 4,110,521 | 8/1978 | Barnett et al. | 422/138 X |
| 4,222,986 | 9/1980 | Smith et al. | 422/135 X |
| 4,408,024 | 10/1983 | Matsuyama et al. | 422/138 X |

FOREIGN PATENT DOCUMENTS

437524  4/1975  U.S.S.R. ..................... 422/138

Primary Examiner—Barry S. Richman
Assistant Examiner—William R. Johnson
Attorney, Agent, or Firm—John K. Abokhair; M. Norwood Cheairs

[57] ABSTRACT

A process and apparatus for the continuous mass polymerization of styrenic and alkenylnitrile monomers. The process comprises the steps of continuously introducing a feed comprising a predetermined ratio of styrenic and alkenylnitrile monomers into a reaction vessel to produce a reaction mixture; subjecting the reaction mixture to conditions of temperature and pressure under which said monomers copolymerize to produce a styrenic/alkenylnitrile copolymer; subjecting the reaction mixture to sufficient agitation; continuously withdrawing styrenic/alkenylnitrile copolymer from the reaction vessel; and devolatilizing the styrenic/alkenylnitrile withdrawn from the reaction vessel by a two-stage procedure including first adjusting the ratio of styrenic to alkenylnitrile monomer therein followed by heating to volatilize the volatile components and then separation of volatile components.

13 Claims, 3 Drawing Figures

APPARATUS FOR PRODUCING STYRENIC/ALKENYLNITRILE COPOLYMERS

CROSS REFERENCE TO RELATED APPLICATIONS

This application is a divisional of a prior copending application, Ser. No. 422,767, filed Sept. 24, 1982, now abandoned, by Jeffrey D. Morris and Robert A. Fuller for "Process and Apparatus for Producing Styrenic-/Alkenylnitrile Copolymers".

BACKGROUND OF THE INVENTION

The present invention relates to a system for the continuous mass polymerization of SAN (styrenic-alkenylnitrile) copolymer, and more especially to both a process and an apparatus for continuous mass polymerization of SAN.

The copolymerization of vinyl monomers, particularly styrene and acrylonitrile as applied here, is well known, as are the processes for their production. However, there are still many inherent problems which have either been unsolved, or in many cases, solved unsatisfactorily.

In the case of SAN polymerization, it is known that precise control is essential to the production of a product having acceptable properties. For example, if the acrylonitrile content of copolymer in a single product varies by more than about 4%, the different copolymers become incompatible with one another, resulting in an unacceptable, hazy product. Because styrene and acrylonitrile monomers polymerize at different rates, careful control is needed not only during the polymerization stage, but also during the subsequent purification stages. Especially in these latter processing stages, it is essential to maintain uniformity of the product, because even small amounts of copolymer product having a high acrylonitrile content can cause a yellow discoloration of the entire product, due to cyclization of adjacent pendant acrylonitrile groups upon heating of the copolymer, e.g., even during subsequent thermoforming steps.

This is an important factor in the post-polymerization treatment of the product in a SAN polymerization process, e.g., the removal of residual monomer from the polymer, known as devolatilizing the polymer. Once the polymer/monomer mixture leaves the reactor there is great risk of producing high-acrylonitrile-containing polymer, due to the uneven rates of polymerization for the two different monomer species and the high temperatures which are utilized for devolatilization. In conventional processes, devolatilization is typically carried out with thin film devolatilizing equipment, such as the so-called "Film Truder", which evaporates the liquid monomer very rapidly to minimize further polymerization. This thin filmm equipment, however, is relatively expensive and requires an inordinate amount of maintenance, e.g., at least once daily, because of its many moving parts and the extensive seals characteristic thereof. This maintenance requires, therefore, that the polymerization line be shut down or that some measure be taken to hold material upstream during maintenance. The result is an uneven quality of product and added expense for equipment and operation.

SUMMARY OF THE INVENTION

It is therefore an object of the present invention to provide a continuous mass polymerization process for SAN copolymer as well as apparatus for carrying out this process.

Additionally, it is an object of the present invention to provide a simple process for the continuous mass polymerization of SAN, in that it can be performed with relatively uncomplicated and inexpensive equipment, and does not require highly trained personnel.

Another object of the invention resides in providing an improved process and apparatus for finishing the crude SAN copolymer as it exits from the polymerization stage, in order to provide for a high quality product while at the same time providing an energy-efficient process.

In accomplishing the foregoing objects, there has been provided in accordance with one aspect of the present invention a process for the continuous mass polymerization of styrenic and alkenylnitrile monomers to produce a styrenic/alkenylnitrile copolymer, comprising the steps of continuously introducing a feed comprising a predetermined ratio of styrenic and alkenylnitrile monomers into a reaction vessel to produce a reaction mixture; subjecting the reaction mixture to conditions of temperature and pressure under which said monomers copolymerize to produce a styrenic/alkenylnitrile copolymer; subjecting the reaction mixture to agitation sufficient to maintain a substantially uniform composition distribution and a substantially uniform temperature distribution throughout the reaction mixture; continuously withdrawing styrenic/alkenylnitrile copolymer from the reaction vessel; and removing volatile components from the styrenic/alkenylnitrile copolymer withdrawn from the reaction vessel, preferably comprising the steps of, in a first stage, restoring in the withdrawn copolymer solution the ratio of styrenic to alkenylnitrile monomer to approximately the same ratio as the predetermined sytrenic:alkenylnitrile ratio of the feed to the reactor (e.g., by withdrawing an amount of alkenylnitrile monomer); and in a second stage, heating the withdrawn styrenic/alkenylnitrile copolymer to a temperature sufficient to volatilize substantially all of the volatile components therein and separating the volatilized components from the nonvolatilized copolymer. Most preferably, the heating step in the second stage comprises passing the withdrawn styrenic-alkenylnitrile copolymer through a heat exchange apparatus and reducing the pressure in the heat exchange apparatus by an amount sufficient to cause substantial volatilization of the volatile components in the copolymer sufficient to cause a froth-type two-phase flow through the heat exchange apparatus.

In a preferred embodiment, the devolatilization step further includes the steps of withdrawing the volatilized components from the separation vessel in the second stage, condensing the withdrawn volatilized components to produce a liquid condensate of recovered monomers, and recycling the recovered monomer liquid to the reaction vessel as part of the monomer feed. The process is further characterized by the step of maintaining an equilibrium concentration of water in the reaction vessel.

In accordance with another aspect of the present invention, there has been provided an apparatus for the continuous mass polymerization of styrenic and alkenylnitrile monomers to produce a styrenic/alkenylnitrile copolymer, comprising a reaction vessel; means for continuously introducing a feed comprising a predetermined ratio of styrenic and alkenylnitrile monomers into said reaction vessel to produce a reaction mixture;

means for subjecting the reaction mixture containing styrenic and alkenylnitrile monomers to conditions of temperature and pressure under which the monomers copolymerize to produce a styrenic/alkenylnitrile copolymer; means for subjecting the reaction mixture to agitation sufficient to maintain a substantially uniform composition distribution and a substantially uniform temperature distribution throughout the reaction mixture; means for continuously withdrawing styrenic/alkenylnitrile copolymer from the reaction vessel; and a devolatilizer for removing volatile components from the styrenic/alkenylnitrile copolymer withdrawn from the reaction vessel. Preferably, the devolatilizer comprises a first stage comprising means for restoring in the withdrawn copolymer solution the ratio of styrene to alkenylnitrile monomers to approximately the same ratio as the predetermined styrene:alkenylnitrile ratio of the feed to the polymerization reactor, preferably means to withdraw an amount of alkenylnitrile monomer, and a second stage comprising means for heating the withdrawn styrenic/alkenylnitrile copolymer to a temperature sufficient to volatilize substantially all of the volatile components therein and means for separating the volatilized component from the non-volatilized copolymer. Most preferably, the heating means in the second stage comprises a heat exchange apparatus, means for passing the withdrawn styrenic/alkenylnitrile copolymer through said heat exchange apparatus and means for reducing the pressure in said heat exchange apparatus by an amount sufficient to cause substantial volatilization of the volatile components in the copolymer sufficient to cause a froth-type two-phase flow through said heat exchange apparatus.

Further objects, features and advantages of the present invention will become apparent from the detailed description of preferred embodiments which follows, when considered together with the attached figures of drawings.

DETAILED DESCRIPTION OF PREFERRED EMBODIMENTS

The present invention is directed to an improved continuous mass polymerization process for making copolymers which utilizes a starting monomer composition comprising, at least one monoalkenyl aromatic (styrenic) compound and at least one alkenylnitrile compound.

The alkenylnitrile compounds are characterized by the general formula:

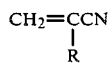

wherein R is selected from the group consisting of hydrogen and alkyl radicals containing from 1 through 4 carbon atoms each.

The monoalkenyl aromatic (styrenic) compounds are characterized by the general formula:

wherein
Ar is selected from the group consisting of a phenyl radical, an alkaryl radical of 6 through 9 carbon atoms, a monochlorophenyl radical, a dichlorophenyl radical, a monobromophenyl radical, and a dibromophenyl radical, and X is selected from the group consisting of hydrogen and an alkyl radical containing less than three carbon atoms.

The preferred alkenylnitrile is acrylonitrile, and the preferred styrenic is styrene itself.

The invention provides a process and apparatus which enable the efficient production of a wide range of SAN copolymer products under a wide range of operating conditions. For example, according to the invention SAN copolymers can be prepared having a proportion of copolymerized acrylonitrile ranging from as little as about 10% by weight up to a maximum of about 60% by weight. A wide range of molecular weights is also possible, e.g., varying from polymers having a melt flow index (ASTM 1238, condition I) as low as about 1 gram/10 min. up to as high as 80 gram/10 min. This wide range of values can be achieved without the use of internal lubricants in the polymer compositions. The polymers are characterized as having a Vicat softening point (ASTM 1525 Rate A) falling within the range of 220°–250° F.

SAN copolymers of excellent purity and quality are producible according to the invention. These compositions have a residual acrylonitrile monomer content of less than about 100 ppm, a residual styrene monomer content of less than about 1000 ppm and a residual diluent content of less than 1000 ppm.

Yet, the process of the invention is also capable of achieving very high rates of reaction and conversion levels. It is possible to achieve a reaction rate as high as 40%/hour for the SAN copolymers, and conversion levels of between 30 and 90%, typically up to about 60%.

A. Reactor

Figure 1:
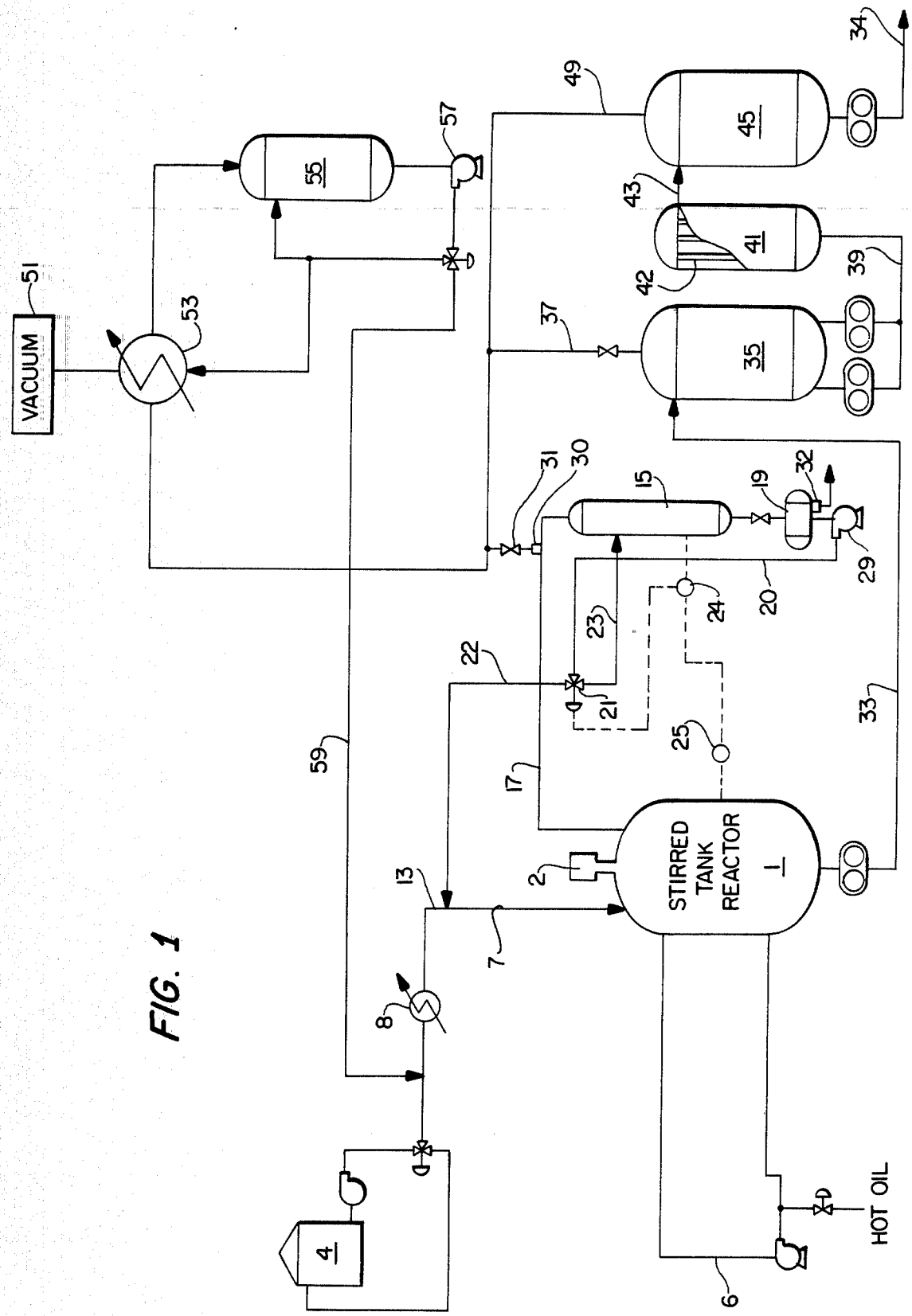
FIG. 1 is a schematic view of a suitable apparatus for carrying out the process according to the present invention.

With reference to FIG. 1 of the drawings, the system utilizes a polymerization reactor vessel 1, the configuration of which is not per se new. The configuration may vary widely, for example, from a configuration which is essentially horizontal to one which is essentially vertical. The preferred design comprises a vertical-type reactor, preferably a vertical cylinder, inasmuch as it has been found that a vertical reactor enables production of a wider range of SAN products. In the past, horizontal type reactors have been preferred for SAN, because of the difficulty in achieving uniform temperature and concentration control from the top to the bottom of a vertical reactor. See, e.g., U.S. Pat. No. 3,813,369. Many types and designs of reactors are known in the art for the polymerization of SAN. It is possible to employ any of these known reactors within the context of the present invention.

The reactor may be jacketed to aid in heat control, especially during start-up. Hot oil is used as the heat exchange medium and it is circulated through external circuit 6. In the instant invention, however, it does not normally play a significant role in temperature control during steady state operation. After start-up, the temperature of the jacket is typically kept at the desired reaction temperature, in order to minimize temperature gradients.

In operation, a mixture of styrene and acrylonitrile monomers is charged into the reactor through line 7, being initially supplied from a supply source 4 and passing through preheater 8. The ratio, for example, of styrene to acrylonitrile in the reaction mixture is selected according to the desired monomeric composition of the copolymer. Typically, compositions comprise about 60–70% by weight styrene and about 30–40% by weight acrylonitrile. The reaction mixture typically also includes an inert diluent, for example, from about 2 to 50% by weight and typically from about 15 to 50% by weight of the total reaction mixture; about 25% is preferred. The percentage may be as low as 2%; however, below this level, plugging can become a problem due to the lack of the diluent. The diluent is preferably selected from the following compounds: ethylbenzene, butylbenzene, benzene, toluene, xylene (all isomers) and cumene; ethylbenzene is preferred. The reactor is usually operated at a temperature of between about 115° and 180° C. and at a pressure of between about 40 and 80 psia.

Figure 2:
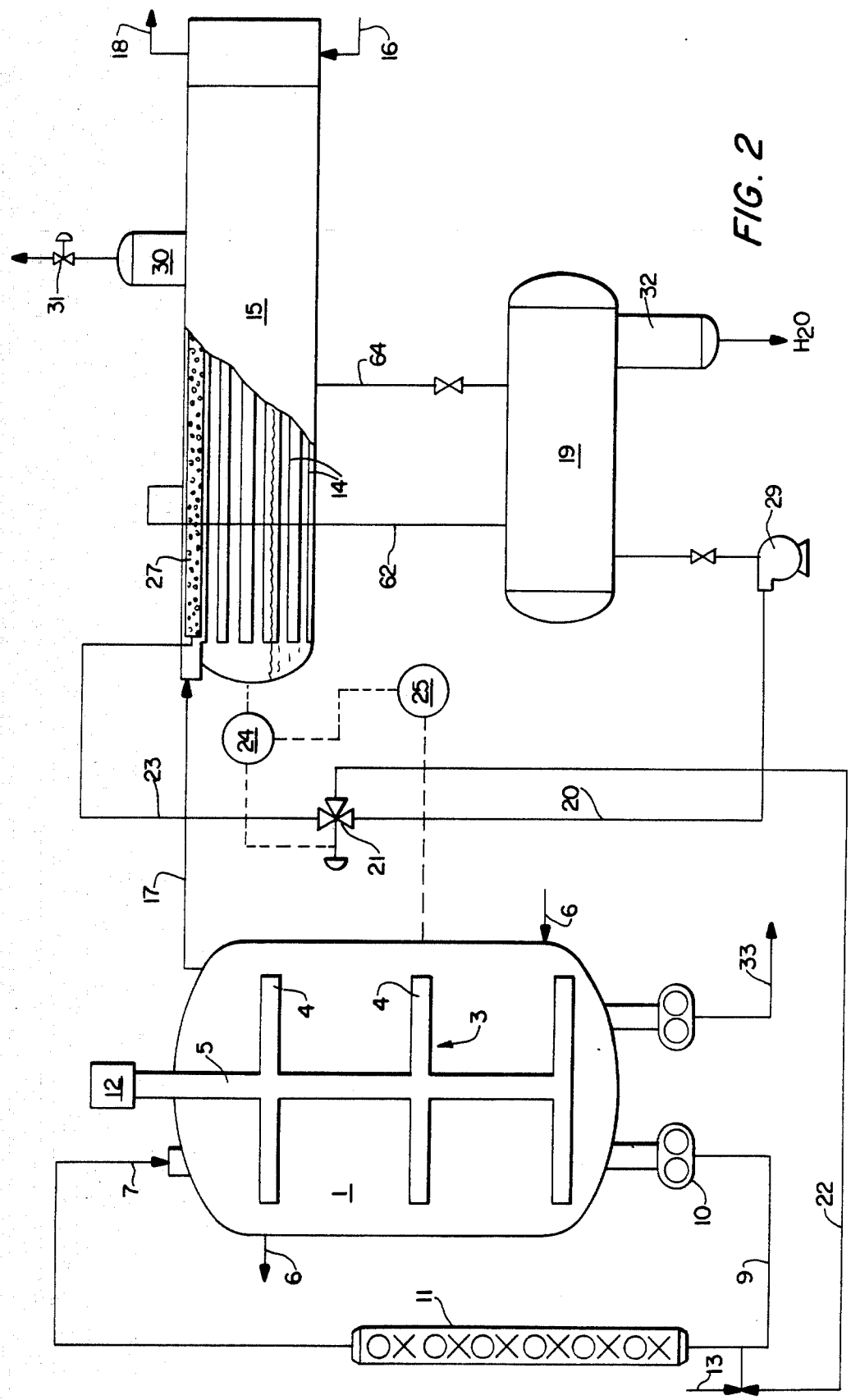
FIG. 2 is a more detailed schematic view of an alternative apparatus for carrying out the controlled temperature polymerization according to the invention.

Referring now to FIG. 2, there is illustrated one preferred reactor design for the present invention. The reactor 1 includes a combination of measures to aid in accomplishing a uniform temperature and composition therein. Inside the reactor is a rotary mixer 3. The mixer has at least one blade or paddle 4 which rotates in a horizontal plane. The mixer may be of any conventional design which will assure lateral uniformity within the reaction medium. The mixer is driven by a motor 2 driving a rotating shaft 5 extending through the top of the reactor and down into the reaction mixture. The mixer is typically operated at speeds between about 20 and 60 rpm.

Lateral uniformity of the reaction mixture is achieved by the rotary mixer 3. Vertical uniformity of the reaction mixture is accomplished according to the invention by withdrawing reaction mixture from the bottom of the reactor and pumping the mixture via pump 10 through an external recycle line 9 in an external loop and then back into the top of the reactor 1. The reaction mixture as it passes through the loop is preferably homogenized in mixing device 11, preferably a static mixer of the type referred to as an "interfacial surface generator". An "interfacial surface generator" is an inline motionless mixer, whose mixing mechanism is generally unrelated to the throughput when the throughput is flowing in the region of streamline flow. Such mixers may be considered as layering mixers wherein the flowing stream is divided and two component parts reshaped and joined together in such a way that the interface between the original elements of the stream is substantially increased. Such mixers are well known in the art and some of these mixers and their mode of operation are described in the following U.S. Pat. Nos.: 3,051,542; 3,051,453; 3,195,865; 3,206,170; 3,239,197; 3,286,992; 3,328,003; 3,358,749; 3,373,534; 3,394,924; 3,404,869; 3,406,947; and 3,506,244. This in-line static mixer may be of any standard design. Suitable mixers are sold by various suppliers under the trade names of Kenics, Koch, and Lightning.

Fresh monomer is introduced into the recycle loop through line 13, upstream of the static mixer 11, as needed to maintain a constant monomeric ratio within the reactor. As will be discussed in more detail below, condensed monomer vapor is also returned to the polymerization vessel by introduction upstream of the static mixing device 11.

The use of the external pumping loop 9 and static mixer 11 in combination with the rotary mixer 3 provides surprising uniformity of temperature and composition throughout the reaction mixture, even in the case of a vertical reactor. The temperature variation from top to bottom in the reactor can be controlled to within $\pm 1°$ C. when the reaction mixture is circulated as little as 1.2 times per hour through the external loop. Similarly, the monomeric composition of the reaction mixture is maintained uniform to within 1%. A 15,000 ton per year plant utilizing the instant design requires only about 200 HP for the rotary mixer 3 and a pump of approximately 60 HP for the external loop.

B. Evaporative Temperature Control

Under steady-state operating conditions, substantially all of the cooling for the reactor 1 is provided by an external monomer condenser 15. Hot monomer vapors are withdrawn from the reactor 1 through line 17 and condensed in condenser 15. The condenser 15 may be of either horizontal or vertical design, with a vertical design illustrated in FIG. 1. Within the condenser are a plurality of tubes cooled by a cooling fluid, such as water. The monomer vapor may be passed on the tube side or on the shell side; however, in a vertical design it is preferably passed on the tube side. Upon contact with the cold tubes, the hot vapor from the reactor is condensed into liquid monomer which collects inside of condenser 15. Also, an additional quantity of the liquid is preferably collected in collector 19. The cooled liquid in collector 19, which is principally monomer, is passed through line 20 to three-way valve 21, from which a portion of the condensed monomer is conducted via line 22 back to monomer feed line 13, upstream of static mixer 11, whereupon the condensed monomer is reintroduced into polymerization reactor 1.

Control over this evaporative cooling system is provided as follows: A temperature controller 25 reads directly the temperature in reactor 1 and operates in cascade with level controller 24 associated with condenser 15. The amount of cooling provided to the reactor is a function of the level of condensed monomer in condenser 15, i.e., the lower the fluid level, the more area of cooling surface is exposed to the monomer vapors. Thus, as more cooling capacity is needed for the reactor, the liquid level in condenser 15 is lowered, and vice-versa. Adjustment of the liquid level in condenser 15 can be accomplished in a number of ways, for example, by providing a feedback signal to three-way valve arrangement 21.

The evaporative cooling arrangement according to the invention actually provides a two-fold mechanism to achieve rapid response to temperature changes within the polymerization reactor. As noted above, the cooling capacity of condenser 15 increases directly as a result of an increase in temperature in the reactor. This is accomplished by lowering the level of condensed monomer within the condenser, and as a result, the volume of condensed monomer displaced from the condenser is injected back into the reactor, thereby producing a secondary and immediate cooling effect. Furthermore, by maintaining a constant supply of condensed monomer in collector 19, the system of the invention also offers the potential for instantaneously injecting the entire quantity of condensed monomer collected therein into the reactor, in the event that a significant instantaneous cooling load is demanded.

Prior art processes utilizing an external condenser for temperature control in mass polymerization processes, such as mass SAN processes, characteristically suffer from the serious problems of plugging and vapor lock in line 17 between the reactor and condenser, for the reason that the cooling load is typically controlled by a control valve in line 17 to control the flow of vapor into the condenser, i.e., this valve was used as the principal temperature regulator. Line 17 has a tendency to become plugged at this valve within a short period of time, e.g., in as little as one or two days of operation. With this plugging comes the loss of cooling capability for the polymerization reactor. It was determined that the plugging at the valve results from the entropy change there due to the slight pressure drop. Another of the problems which plagued prior art systems using external vapor condenser cooling was vapor lock in the vapor line 17. This was determined to be caused by accumulation of non-condensibles in the system, e.g., air.

These problems are solved in part according to the present invention by the elimination of the valve in line 17. This was especially true for the plugging problem of the valve, inasmuch as the removal of the valve eliminated the source of the problem. Regarding the vapor lock problem, the removal of the valve eliminated a source of pressure variation, and thus of vapor lock. Also, the inlet to the condenser 15 should be situated above the reactor to eliminate vapor traps.

As mentioned, part of the cause of vapor lock in such a system was found to be the presence of oxygen and other non-condensibles. To eliminate non-condensibles, the condenser has a pressure control valve 31 on the top thereof. This pressure controller utilizes a trap 30 for non-condensibles and controls the pressure at just above the vapor pressure of the condensed liquid. Therefore, if any non-condensibles build up in the trap 30, the pressure will increase slightly and will be vented automatically by the pressure control valve 31.

The operation of a preferred means for eliminating non-condensibles is as follows: The pressure control valve 31 is positioned at the top of condenser 15 above a trap 30 for non-condensibles, so that any build-up of non-condensible occurs in trap 30. If the pressure control valve is set at a release pressure just slightly above the vapor pressure of the condensed liquid, the non-condensibles are automatically vented.

The non-condensibles can also be vented in an alternative arrangement. Since these stagnant non-condensibles have a lower temperature than the hot vapor, as the interface between the non-condensibles and the hot vapor can be sensed by a temperature transducer. As this interface descends past the first of a pair of temperature transducers indicating a build-up of non-condensibles, the change in temperature is sensed and the non-condensibles are vented. This embodiment can be integrated with the first embodiment, and in such a combined system the pair of temperature transducers may operate as an override for the pressure controller.

As a further means to protect against condensation, the vapor line 17 is insulated to assure that there is no cooling in the line.

Another of the problems found in prior art evaporative cooling systems is plugging of the condenser. While vapor phase polymerization is practically non-existant, hot liquid styrene and acrylonitrile monomers polymerize readily. Therefore, the plugging of the tubes of the condenser occurs because the superheated vapor condenses to very hot liquid on the tubes. This liquid can readily polymerize. The design according to the present invention has eliminated this problem and, at the same time, permits even more precise temperature control than was possible in the prior art. This is accomplished by recirculation of a portion of the mixture of cooled monomer and diluent to the condenser from collector 19. The condensed monomer mixture passes from 19 by line 20 through three-way valve 21. This valve splits the monomer flow into a stream 22, recirculating into reactor 1, and a second stream 23 flowing into the condenser 15. This recirculation through line 23 solves the problem of condenser polymerization. The condensate is injected into the condenser 15 at the point of entry of the superheated vapor stream from the reactor. It is injected in the form of a curtain of spray, through which the vapor passes. This cool spray acts as a quencher for the hot vapors and reduces the heat of the liquid monomers on the cooling tubes, thus reducing polymerization. In addition, the cooling spray is directed so as to continually wash the cooling tubes, further cooling the liquid monomer condensed on the tubes and reducing the residence time of condensed monomer on the cooling tubes.

By use of the quench spray, polymerization within the condenser is virtually eliminated. In a vertical heat exchanger, the entering hot vapor stream passes through the cooling spray. The amount of cooled monomer passing through line 23 is controlled such that it is greater than the amount of monomer condensing from vapor on the cooling tubes. The cooled monomer recycled into the condenser thus forms a film of cool monomer running down the tubes continually. Advantageously, the cool monomer is introduced with 180° coverage. In a horizontal condenser, the recycled condensate is advantageously introduced via a pipe running the entire length of the top of the condenser. This pipe would have a plurality of holes or nozzles along its length to enable it to wash the entire length of the cooling tubes within the condenser.

FIG. 2 depicts an alternative embodiment of the reactor and temperature control system wherein a horizontal condenser is employed. Reactor 1 embodies an external recirculation loop 9 including static mixer 11. Condenser 15 is horizontally oriented and includes a plurality of tubes 14 through which a cooling medium flows, for example, cooling water entering through line 16 and exiting through line 18. Monomer-containing vapors exiting from reactor 1 through line 17 enter condenser 15 and are condensed upon contact with the outside surfaces of tubes 14. The surface area of tubes 14 available for contact with the monomer-containing vapors is regulated by the level of condensed liquid retained in condenser 15. This liquid level is controlled by level controller 24 in response to the temperature inside reactor 1 as monitored by temperature controller 25. Control is through adjustment of three-way valve 21, which controls the amount of condensed liquid returned to reactor 1 through line 22 and the amount recycled to the condenser 15 through line 23.

Condensed liquid recycled to condenser 15 is fed into a pipe 27 which runs near the top of condenser 15 and along its entire length. Pipe 27 contains a plurality of outlet apertures by means of which the condensed liquid is caused to be sprayed across all of the tubes 14, to prevent the build-up of polymer thereon. Furthermore, the monomer-containing vapors are caused to pass through a curtain of spray as they enter condenser 15 through line 17, whereby the vapors are quenched.

Condensed monomer and diluent are preferably passed via line 64 from condenser 15 to a collection tank 19, wherein a substantial volume of condensed, cooled monomer is kept in storage. Typically, the volume of condensate stored is between about 5 and 30% by volume of the volume of the reaction mixture in the reactor 1, although there does not need to be any condensate stored. This feature merely serves to increase the responsiveness and flexibility of the system, as described above. The liquid in collector 19 is pumped through line 20 to three-way valve 21 by condensate return pump 29. Any water accumulating in the system is collected in trap 32 and is withdrawn in order to maintain the water at its equilibrium concentration in the system. The pressure is equalized between condenser 15 and collector 19 by means of line 62.

A non-condensibles trap 30 and pressure control valve 31 are provided for continuously purging the system of non-condensibles, in particular, of oxygen. The alternative system described above can also be used here.

The mass polymerization system as thus far described provides one other very significant advantage over the prior art. In prior art SAN production systems, it was necessary that the reactor be made of stainless steel. A reactor of less expensive carbon steel would quickly corrode, causing black specks in the polymer. Additionally, carbon steel was believed to cause popcorn SAN polymer which would plug transfer lines and equipment. This problem has been solved by the design according to the invention as well, allowing very substantial cost savings. In the system of the invention, as was mentioned above, the non-condensibles are continuously purged from the reactor. This eliminates corrosion due to the presence of oxygen within the reactor. Additionally, it is also a feature of the invention to maintain the amount of water within the system at or below its equilibrium concentration, i.e., about 5-6%. Thus, any liquid water within the reaction mixture is prevented from contacting the reactor walls by maintaining the water in solution. Excess water is removed in the condenser system via water draw 32, which is of conventional design and which is located in a trap at the bottom of collector 19. Water separates from the relatively cool monomer mixture in collector 19, because the solubility of water in acrylonitrile decreases as acrylonitrile is cooled. Thus, by removing water from the monomer mixture at this point, the water concentration within the reactor is kept at a sufficiently low level to ensure that it is completely solubilized. This removal of water and non-condensibles provides significant cost advantages over prior art systems by allowing the use of carbon steel reactors. The popcorn polymer problem of the prior art is also eliminated.

The system of the present invention allows the making of SAN copolymers using a reaction temperature of from 115° to about 180° C., preferably 130° to 155° C., also the system operates within a pressure range of from 40 to 80 psia.

C. POLYMER WORK-UP

A portion of the reaction mixture in reactor 1 is continually withdrawn through line 33 for further processing. With a SAN polymerization process, it is necessary to remove the residual volatiles (styrene, acrylonitrile and ethylbenzene) and it is preferable to recycle them back into the reactor. The devolatilized polymer is then pelletized or otherwise processed for commercial use after leaving the devolatilization stage via line 34.

As noted above, the disagreeable yellow color is produced in the SAN polymer when acrylonitrile groups polymerize in series and then cyclize upon exposure of the polymer to elevated temperatures. Under polymerization conditions in the reactor, styrene polymerizes more rapidly. Thus, there is an excess of acrylonitrile monomer in the monomer-polymer mixture which has been withdrawn from the reactor for further processing. This increases the likelihood of adjacent polymerization of acrylonitrile in the copolymer chains, changing the monomeric ratio in the final polymer, and leading to yellowing in the polymer product. As also noted above, the presence of SAN polymers having differing monomer ratios causes clouding of the product. This problem is addressed by the prior art by removing the volatiles from the polymer as quickly and at as low a temperature as possible. Most commercial installations use a complex and very expensive thin film evaporator marketed under the trademark of FILM TRUDER. The FILM TRUDER heats and devolatilizes a thin film of polymer very quickly, in less than 1 or 2 minutes. The drawback of the FILM TRUDER is that it has a complex system of mechanical seals and rotating equipment requiring daily maintenance and accompanying shutdown or bypassing of the equipment. The system provided in accordance with the present invention eliminates the disadvantages of prior art processes for an equipment cost of approximately one-fourth that of the FILM TRUDER.

The reactor 1 is operating at superatmospheric pressure. A polymer solution is withdrawn from the reactor through line 33 at a temperature of from about 115° C. to about 180° C., preferably about 140° C. The polymer mixture is passed into a first devolatilizer unit 35 without preheating. Devolatilizer 35 operates at a pressure above atmospheric pressure, but at a lower pressure than reactor 1. The pressure drop from line 33 into devolatilizer 35 causes a portion of the acrylonitrile and styrene monomers in the hot polymer solution to flash off. Since acrylonitrile has a higher vapor pressure than styrene, the amount of acrylonitrile removed may be controlled by controlling the pressure of devolatilizer 35. The pressure in devolatilizer 35 is controlled such that acrylonitrile monomer is flashed off in sufficient amounts to provide a monomer ratio in the solution which will produce, upon polymerization, a SAN copolymer having substantially the same ratio of styrene to acrylonitrile monomer units as the SAN copolymer exiting from the reactor. Normally, this would involve restoring the monomer ratio to the same ratio as that initially fed into the polymerization reactor. With the monomer balance thus restored, small amounts of additional polymerization in the subsequent processing steps will not disturb the copolymer ratio (or homogeneity) in the finished polymer. Devolatilizer 35 may be of any design suitable for controllably flashing off acrylonitrile. In one embodiment, the devolatilizer is a simple flash pot or one-stage distillation apparatus. The devolatilizer 35 may alternatively comprise a vessel having a distribution nozzle to inject the hot polymer solution into the interior thereof, with provision at the top for removing vapors and provision at the bottom for removing liquid. The temperature in devolatilizer 35 is preferably between about 115° and 190° C., and the pressure between about 25–30 psia.

The acrylonitrile monomer-rich overhead product is removed from devolatilizer 35 through line 37 for recycling into the reactor via a condenser unit, which will be described more fully below. The polymer/monomer solution is removed from the first devolatilizer 35 via line 39 and is transferred into preheater 41. Preheater 41 is a heat exchanger capable of heating the polymer solution from a temperature of about 70° C. (to which the temperature can drop in the first devolatilizer 35) up to a temperature of from about 190° to 260° C. The heated polymer mixture then moves from preheater 41 through line 43 into a second devolatilizer 45, which operates preferably within this last mentioned temperature range. Even though the solution now has a monomeric composition which is similar to that being fed to the reactor, the polymerization reaction must not be allowed to go to completion, or a SAN copolymer having a molecular weight lower than that of the product removed from the reactor would form, causing a decrease in the quality of the product. Therefore, it is essential that the residence time in preheater 41 be as low as possible, that there be a low heat history in the preheater and also that the volatiles be removed as quickly as possible in the subsequent devolatilizer 45. Toward this end, line 43 is made of relatively large diameter, sufficient that the absolute pressure from devolatilizer 45, which is typically between about 0.2 and 0.3 psia, is approximately equivalent in preheater 41. Furthermore, the tubes 42 themselves in the preheater heat exchanger are made sufficiently large that the polymer/monomer solution therein experiences the vacuum from the second devolatilizer 45.

Running preheater 41 under a partial vacuum produces surprising and advantageous results. In the first portion of the tubes 42 in preheater 41, the monomer in the polymer solution is heated to boiling temperature. The boiling temperature is quite low, because of the low pressure in the heat exchanger. The pressure in the heat exchanger permits boiling at temperatures as low as about 150° C. The polymer/monomer solution now becomes a two-phase fluid, advantageously a foam, and is rapidly heated in the remainder of the heat exchanger to the temperature necessary for good devolatilization, approximately 230° C. It has surprisingly been found that the two-phase liquid has a heat transfer coefficient of about 6 BTU/hr °F. ft$^2$, which is generally about three times higher than that of the liquid polymer solution. Because turbulent flow of the two-phase fluid allows it to absorb heat much more rapidly than a laminar flow of a viscous polymer solution, it is possible to heat the two-phase fluid to the proper devolatilization temperature in approximately one-third the time required to heat a single phase of polymer/monomer liquid. It is important that the preheater be designed with a relatively large number of tubes of a large enough diameter so that the vacuum may be pulled back through the tubes and so that there is formed the two-phase, preferably foamed or frothed fluid therein. Preferably, the length and diameter of the tubes 42 are chosen such as to permit this two-phase flow.

In addition to decreasing the residence time of the polymer in the heat exchanger or preheater 41, the early boiling of the volatiles to form the two-phase fluid provides the added advantage that the acrylonitrile is now in the vapor phase. As discussed above, acrylonitrile monomer does not readily polymerize in the vapor phase. This further reduces the possibility of the formation of SAN having non-uniform molecular weight (and thus an off-color copolymer).

A third advantage is realized when the two-phase fluid is introduced into devolatilizer 45. In the prior art, when a pressurized liquid polymer solution of the appropriate temperature for devolatilization was introduced into the devolatilizer, the monomer would boil at the injection nozzle. This boiling would reduce the temperature of the polymer by as much as 25° C. as the volatiles absorbed their latent heat of vaporization. This phenomenon would result in a colder polymer which is thus more difficult to pump and, therefore, requires more energy. In addition, the temperature of the melt fluctuates at the die by as much as about 25° C., causing problems in pelletizing e.g., surging and improper temperature control leading to pellets having poor properties.

By contrast with the prior art, in the present system the second devolatilizer functions mainly as a phase separation chamber. A constant temperature polymer is produced, and there is little cooling as the polymer drops down through the second devolatilizer. The devolatilized polymer is withdrawn through line 34 and has a purity of about 99.80%. The remaining 0.20% consists essentially of volatiles. If an extremely high purity SAN copolymer is desired, another devolatilizer of the same type as devolatilizer 45 may be provided downstream of devolatilizer 45. The overhead product of diluent, acrylonitrile monomer and styrene monomer is withdrawn through line 49 for further processing and/or injection into reactor 1.

As indicated above, a vacuum is pulled in the second devolatilizer 45; and in part also in the first stage devolatilizer 35, in order to withdraw diluent and unpolymerized monomer which are subsequently condensed and preferably returned to the polymerization reactor. Any conventional source of vacuum, designated by reference numeral 51, may be employed in the system according to the present invention. For example, a conventional steam jet vacuum source may be employed. However, it is also possible, and it is preferred according to the invention, to employ a relatively simple low pressure system which uses rotary blowers as the source of negative pressure. The system according to the invention does not require refrigeration, thereby eliminating costly equipment and a significant operating expense factor. It is also possible to employ a liquid sealed vacuum pump; however, this produces a large quantity of contaminated water, an environmental problem which is also obviated by the preferred system according to the invention.

The volatile components from the devolatilizing system are drawn by the vacuum from vacuum source 51 into recycle condenser 53, which is cooled by cooling water. Condensed monomers and diluent pass from recycle condenser 53 to recycle surge drum 55, from which they are pumped by recycle pump 57 via line 59 back to reactor 1. These recycled components are preferably introduced upstream of preheater 8.

Figure 3:
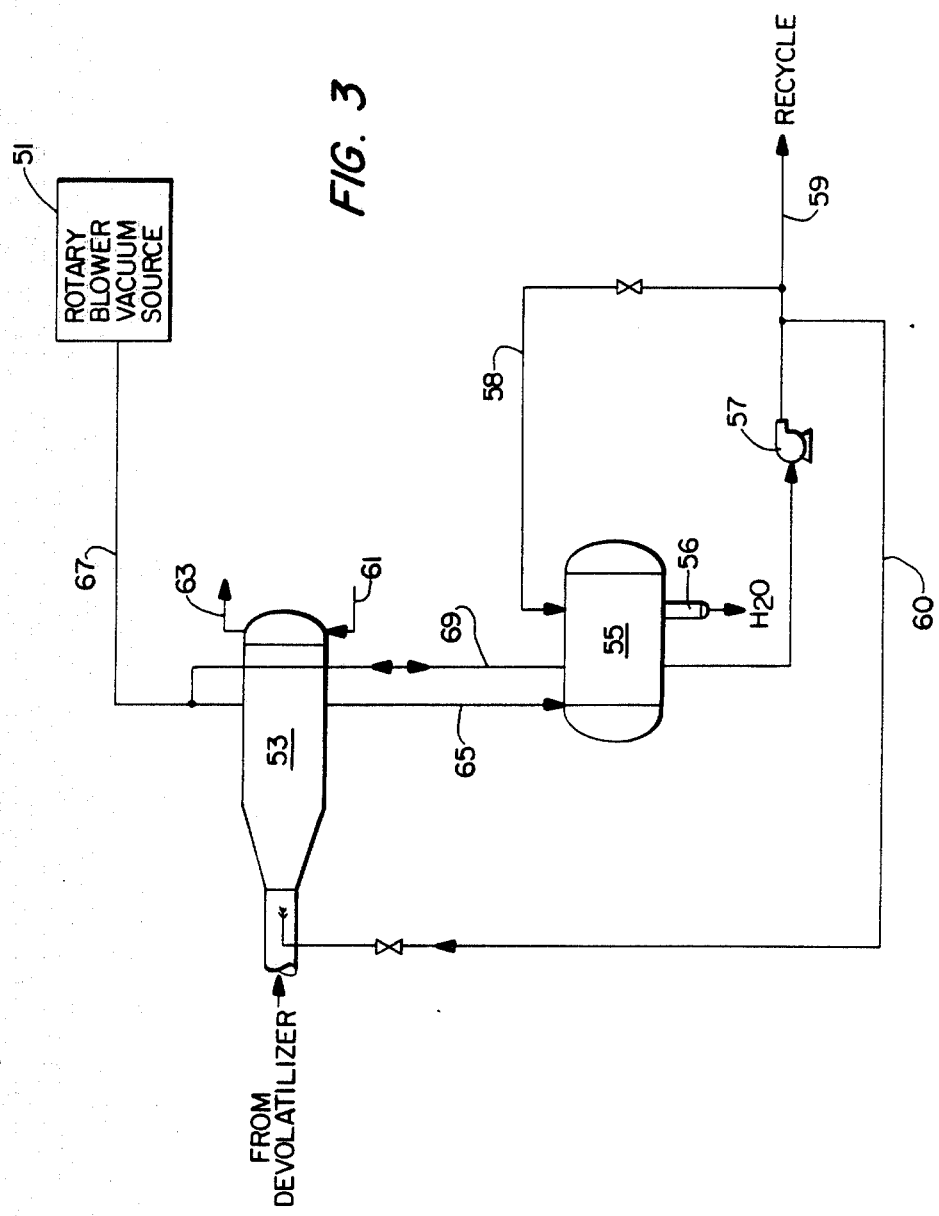
FIG. 3 is a schematic view illustrating a preferred apparatus for condensing and recycling recovered monomers according to the invention.

In FIG. 3 is illustrated a preferred recycle condenser system according to the invention. Recycle condenser 53 is fed with cooling water via line 61, and the cooling water leaves the condenser via line 63. The condenser 53 receives the volatilized constituents (diluent and monomers) from the devolatilizer system, and after the volatiles are condensed, they are transported in liquid form to recycle surge drum 55 via line 65. Recycle surge drum is provided with a trap 56 for removal of any water in the system.

Condenser 53 is connected to the vacuum supply via line 67, and the pressure is equalized between the condenser and surge drum 55 by providing interconnection through line 69. The vacuum in the recycle condenser system is limited by the hydrocarbon vapor pressure in surge drum 55, and therefore, it is desirable to maintain the temperature as low as possible. Typically, the temperature is maintained between about 27° and 38° C.

Liquid monomer and diluent are withdrawn from surge drum 55 and pumped by recycle pump 57 through line 59 back to the polymerization reactor, as described above. Provision is also made to selectively recycle a portion of the condensate through line 58 back to the surge drum 55 and/or a portion thereof through line 60 back to the condenser 53. In the latter case, the recycled liquid is advantageously injected through a spray nozzle into the incoming stream of volatiles.

Condenser 53 is designed to produce a pressure drop thereacross of less than about 2 mm Hg, and it is sized such that there is less than about 2° C. approach between the cooling water and the hydrocarbon leaving it. Typically, the cooling water entering is at a temperature between about 16° and 29° C., and the water leaving is between about 20° and 32° C. The pressure in the condenser system is typically between about 0.2 and 0.3 psia.

The following example will further illustrate the present invention in greater detail; however, it is to be understood that the scope of this invention is not to be limited by this example:

EXAMPLE 1

In a vertical stirred tank reactor having a volume of 6,000 gals. a mixture of styrene and acrylonitrile is copolymerized. A continuous stream of reaction mixture is withdrawn from the bottom of the reactor, passed through an external loop which incorporates a static mixing zone and is reintroduced into the top of the reactor at a rate sufficient to turn over the reaction mixture about 1.2 times per hour. The mixture is conveyed by a positive displacement type pump which is operated at a constant speed. An uninterrupted feed stream of liquid monomer composed of about 70 weight percent styrene and 30 weight percent acrylonitrile is charged into the circulating stream of reaction mixture just prior to the point at which it enters the static mixing zone at a rate of about 4,000 pounds per hour. An additional charge of recycled monomers composed of about 28 weight percent sytrene, 34 weight percent acrylonitrile, and 38 weight percent diluent is continuously fed at a rate of about 4,400 lbs. per hour into the external recirculation loop at the same point as the fresh feed stream. The combination of the recycle and feed monomers is thoroughly mixed with the reaction mixture via the static mixing zone. This mixture is then passed back into the reactor.

A thoroughly homogeneous composition is maintained in the reaction zone by a combination of the external recirculation loop and agitation with an agitator suspended from the top of the reactor. The agitator includes both anchor and turbine-type blades turning at a speed of 30 rpm. This combined agitation is sufficient to insure a maximum temperature gradient from the top of the reaction mixture to the bottom of ±1° C.

The polymerization reactor is jacketed and a heat transfer oil is circulated through the jacket. The temperature of the oil is maintained at a constant temperature of about 144° C. by an automatic control.

Upon reaching steady state, the liquid contents of the reactor are held at a constant temperature of about 144° C. and at a pressure of about 40 psia. A constant liquid volume is maintained in the reactor by continuously withdrawing a portion of the partially polymerized reaction mixture from the bottom at a rate equal to that of the combined feed and recycle streams entering the reactor. This stream is composed of about 48 weight percent styrene/acrylonitrile copolymer, 14.5 weight percent styrene monomer, 17.5 weight percent acrylonitrile monomer, and 20 weight percent diluent.

The copolymer contains about 29 weight percent acrylonitrile and 71 weight percent styrene and is of a homogeneous composition. There is an absence of color, with the polymer being essentially clear.

The heat of polymerization is removed by boiling monomers from the reaction zone at a controlled rate. A vertical heat exchanger of the shell and tube type located adjacent to the reactor is used to condense the hot vapors, the vapors being condensed on the inside of the tubes and the shell being circulated with cooling water.

A liquid level is maintained in the tubes of the condenser, with the monomers being returned immediately to the reactor at the same point of entry as the feed and recycle streams. The rate of cooling is controlled by adjusting the level of liquid monomer in the tubes of the condenser, thus adjusting the area available for condensation. A sidestream of cooled monomers is sprayed into the top of the condenser above the point at which the vapors from the reactor enter. The vapor stream, composed of about 8 weight percent styrene, 78 weight percent acrylonitrile, and 14 weight percent diluent enters the condenser at about 144° C. A volume of condensate from the condenser is stored in a collection tank positioned between the condenser and the condensate recycle pump. This volume amounts to approximately 500 gals.

The copolymer/monomer mixture exiting the reactor is forwarded to the devolatilization section by a variable speed gear pump. This pump maintains a constant level in the reaction zone. This mixture is passed through a jacketed pipe circulated with heat transfer oil which is run at the same temperature as that in the reactor jacket and enters the first of the two devolatilization vessels. The liquid mixture is at a temperature of about 144° C. The first vessel is maintained at a pressure of about 29 psia by an automatic pressure control. Vapors composed of about 19 weight percent styrene, 51 weight percent acrylonitrile and 30 weight percent diluent are boiled out of the copolymer mixture as it enters the vessel at a rate of about 2,200 pounds per hour. The resulting polymer mixture composed of about 13 weight percent styrene, 5.5 weight percent acrylonitrile, 16.5 weight percent diluent, and about 65 weight percent styrene/acrylonitrile copolymer at about 77° C. falls to the bottom of the vessel and is forwarded out by a pump. The ratio of styrene and acrylonitrile monomers is approximately the same as in the feed ratio to the polymerization reactor.

From the bottom the copolymer solution enters the tube side of a vertical shell and tube type heat exchanger, in which it is heated to a temperature of about 230° C. by heating oil circulated on the shell side. The design of this preheater is such that a vaporization of the monomer occurs within the tubes and a foaming mixture of monomer/polymer is formed. The flow characteristics of this foamed mixture is such that it allows for much better heat transfer than with a conventional exchanger of this type, allowing for a much smaller heating zone. The tubes are sufficiently large to allow the vacuum from the second stage of the devolatilizer to extend into them and to permit foaming of the monomer/polymer mixture therein. The length of each tube is 12 feet and the diameter is 1¼ inches.

The two-phase mixture exits the preheater at about 233° C. and enters the second devolatilization vessel through a distribution nozzle where it is separated into small strands. The vessel is operated at a pressure of about 0.29 psia and at 230° C. A mixture of about 37 weight percent styrene, 16 weight percent acrylonitrile, and 47 weight percent diluent is taken off as a vapor, is condensed and is recycled and returned to the reaction vessel. The resulting devolatilized copolymer composed of about 0.15 weight percent styrene, 0.01 weight percent acrylonitrile, 0.05 weight percent diluent, and 99.79 weight percent copolymer falls to the bottom of the vessel and is passed through a pump to the pelletizing dies.

EXAMPLES 2-6

The procedure of Example 1 is repeated with various changes in parameters. The parameters for these additional Examples, as well as Example 1, are summarized in the following table.

means for continuously withdrawing styrenic/alkenylnitrile copolymer from the reaction vessel; and a devolatilizer for removing volatile components from the styrenic/alkenylnitrile copolymer withdrawn from the reaction vessel, wherein said devolatilizer comprises a first stage comprising means for restoring in the withdrawn copolymer the ratio of styrenic to alkenylnitrile monomers to approximately the same ratio as the predetermined styrenic:alkenylnitrile ratio of the feed including means for maintaining the pressure of the first stage devolatilizer at a level sufficient to provide a monomer-containing vapor phase and means for selectively venting alkenylnitrile monomer-rich vapor; and a second stage comprising means for heating the withdrawn styrenic/alkenylnitrile copolymer to a temperature sufficient to volatilize substantially all of the volatile components therein, and means for separating the volatilized component from the nonvolatilized copolymer.

2. An apparatus as defined in claim 1, further comprising a preheater for the feed upstream of said feed introduction means.

3. An apparatus as defined in claim 1, wherein said heating means in said second stage comprises a heat exchange apparatus, means for passing the withdrawn styrenic/alkenylnitrile copolymer through said heat exchange apparatus and means for reducing the pressure in said heat exchange apparatus by an amount sufficient to cause substantial volatilization of the volatile components in the copolymer sufficient to cause a froth-type two-phase flow through said exchange apparatus.

4. An apparatus as defined in claim 3, wherein said heat exchange apparatus comprises a plurality of tubes for the copolymer, said tubes having a diameter suffi-

| EXAMPLE No. | POLY TEMP. °C. | REACTOR PRESS (psia) | AGITATOR RPM | JACKET TEMP. (°C.) | FEED | | | | COPOLYMER | | | | MELT FLOW (G/10') |
|---|---|---|---|---|---|---|---|---|---|---|---|---|---|
| | | | | | RATE (lbs/hr) | % STYRENE | ACN | % POLYMER | RATE (lb/hr) | % STYRENE | ACN | MW | |
| 1 | 144 | 40 | 30 | 144 | 4,000 | 70 | 30 | 50 | 4,000 | 74 | 26 | 120,000 | 14.0 |
| 2 | 155 | 50 | 26 | 155 | 4,000 | 70 | 30 | 50 | 4,000 | 74 | 26 | 105,000 | 27.0 |
| 3 | 130 | 30 | 26 | 130 | 4,000 | 70 | 30 | 50 | 4,000 | 74 | 26 | 155,000 | 3.0 |
| 4 | 144 | 40 | 30 | 144 | 200 | 70 | 30 | 50 | 200 | 74 | 26 | 120,000 | 14.0 |
| 5 | 130 | 30 | 26 | 130 | 4,000 | 60 | 40 | 50 | 4,000 | 67 | 33 | 150,000 | 3.0 |
| 6 | 155 | 50 | 28 | 155 | 20,000 | 70 | 30 | 50 | 20,000 | 74 | 26 | 105,000 | 25.0 |

What is claimed is:

1. An apparatus for the continuous mass polymerization of styrenic and alkenylnitrile monomers to produce a styrenic/alkenylnitrile copolymer, comprising:
a reaction vessel;
means for continuously introducing a feed comprising a predetermined ratio of styrenic and alkenylnitrile monomers into said reaction vessel to produce a reaction mixture;
means for subjecting the reaction mixture containing styrenic and alkenylnitrile monomers to conditions of temperature and pressure under which said monomers copolymerize to produce a styrenic/alkenylnitrile copolymer;
means for subjecting the reaction mixture to agitation sufficient to maintain a substantially uniform composition distribution and a substantially uniform temperature distribution throughout the reaction mixture;

ciently large to permit said two-phase froth-type flow.

5. An apparatus as defined in claim 1, wherein said separating means in said second stage comprises a separation vessel, means for passing the two-phase copolymer/volatilized components stream from the heat exchange device into said separation vessel, and means for reducing the pressure in said separation vessel to a level sufficient to maintain the volatilized components in vapor form.

6. An apparatus as defined in claim 5, wherein said devolatilizer further includes means for withdrawing the volatilized components from said separation vessel in the second stage, a condenser for condensing the withdrawn volatilized components to produce a liquid condensate of recovered monomers, and means for recycling the recovered monomer liquid to said reaction vessel as part of the monomer feed.

7. An apparatus as defined in claim 1, further comprising means for cooling the reaction mixture by withdrawing a vapor phase containing vaporized styrenic and alkenylnitrile monomer from the reaction vessel.

8. An apparatus as defined in claim 7, wherein said cooling means further comprises a condenser for condensing the vaporized styrenic and alkenylnitrile withdrawn from the reaction vessel to produce a condensed monomer-containing liquid and means for returning the condensed monomer-containing liquid to the reaction vessel.

9. An apparatus as defined in claim 8, wherein said cooling means further comprises a vessel for collecting a volume of the condensed monomer-containing liquid, and means for selectively introducing the collected monomer-containing liquid into the reaction vessel to produce an instantaneous cooling effect.

10. An apparatus as defined in claim 8, wherein said cooling means further comprises means for impinging said recycled condensed monomer-containing liquid against the cooled surface area to prevent accumulation of polymerized monomer on said surface.

11. An apparatus as defined in claim 8, wherein said cooling means further comprises means for contacting the walls of the reaction vesel with a liquid cooling medium.

12. An apparatus as defined in claim 8, wherein said cooling means further comprises means for recycling a portion of the condensed monomer-containing liquid to the condensing step and means for quenching the vaporized monomer withdrawn from the reaction vesel by passing the withdrawn vaporized monomer through a stream of the recycled condensed monomer-containing liquid.

13. An apparatus as defined in claim 12, wherein said quenching means comprises means for producing a curtain-like distributed condensed monomer-containing liquid stream.

* * * * *